(No Model.) 2 Sheets—Sheet 1.
L. PAGET.
TRANSFORMER OR CONVERTER FOR ALTERNATING ELECTRIC CURRENTS.
No. 413,810. Patented Oct. 29, 1889.
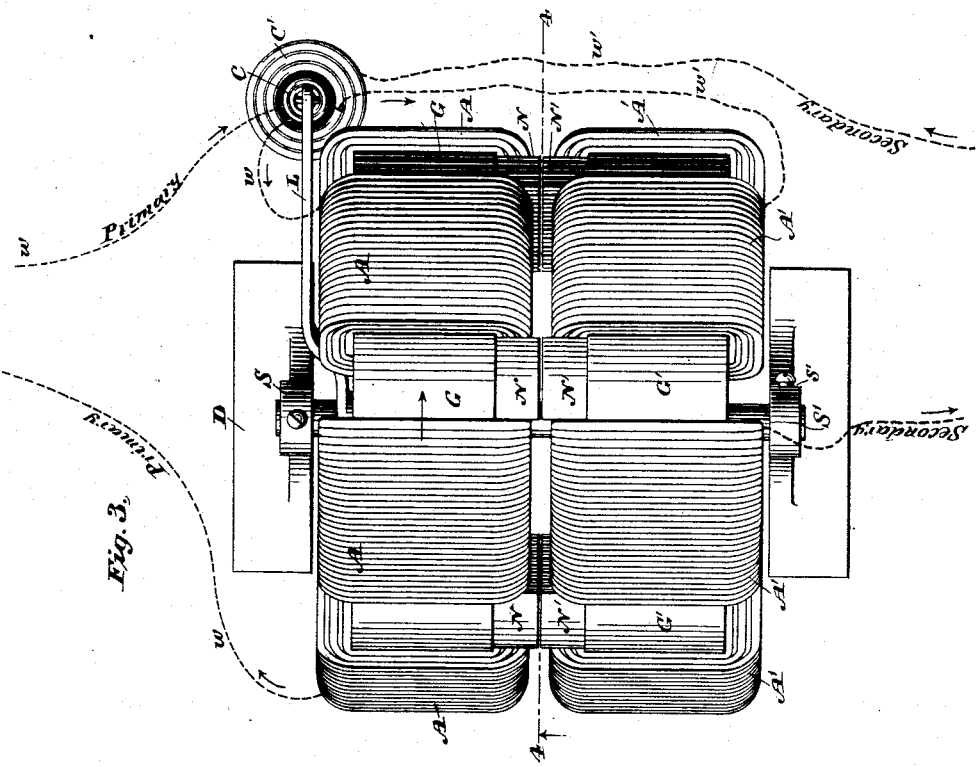
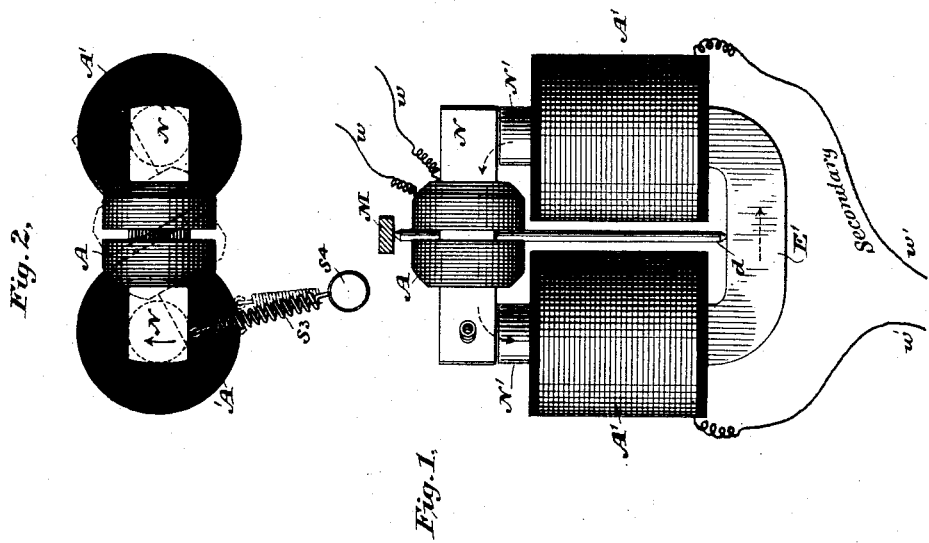
Witnesses
Geo. W. Breck.
Edward Thorpe.
Inventor
Leonard Paget
By his Attorney
C. J. Kintner

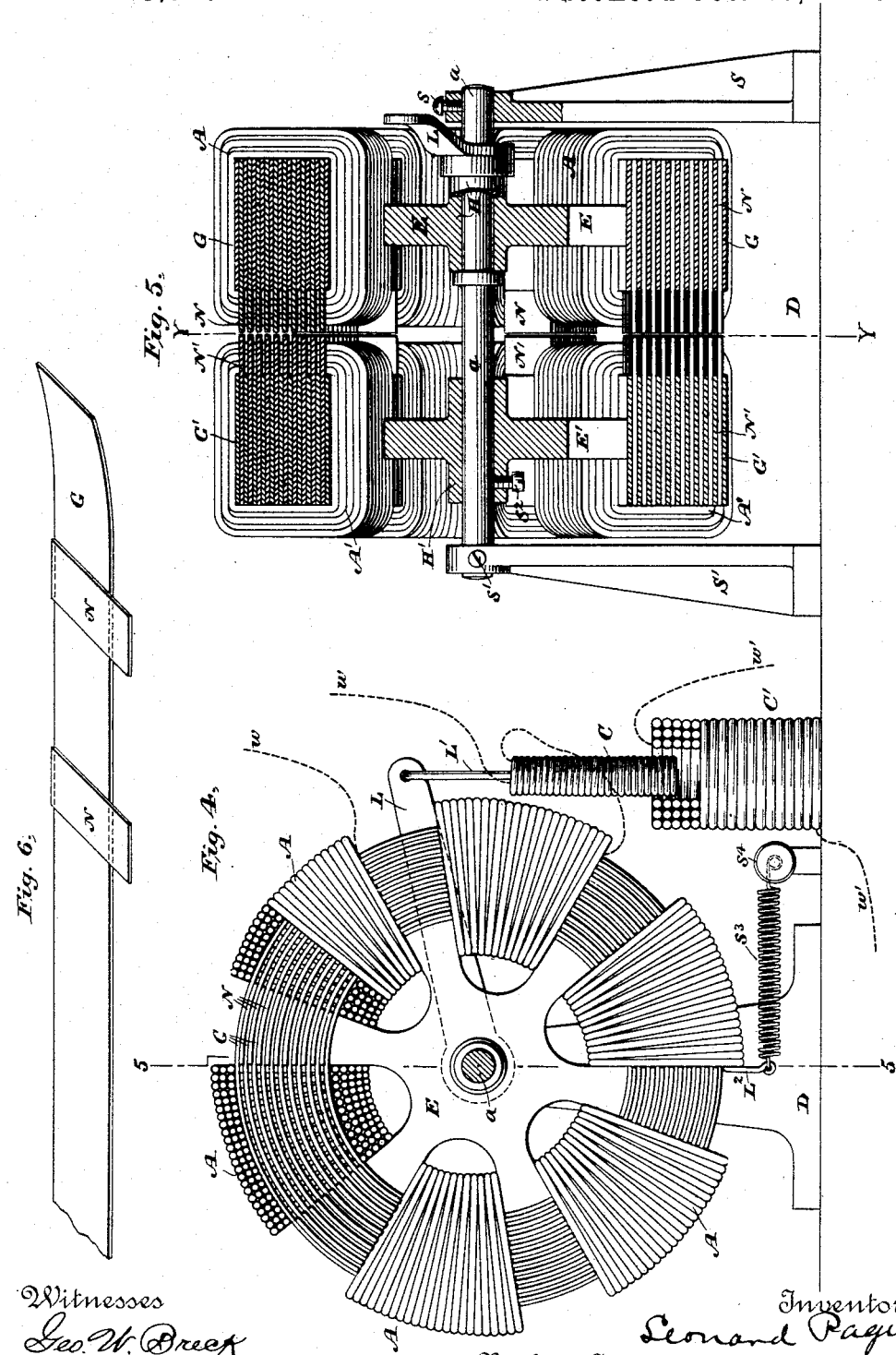

UNITED STATES PATENT OFFICE.

LEONARD PAGET, OF NEW YORK, N. Y., ASSIGNOR OF ONE-HALF TO CHARLES J. KINTNER, OF SAME PLACE.

TRANSFORMER OR CONVERTER FOR ALTERNATING ELECTRIC CURRENTS.

SPECIFICATION forming part of Letters Patent No. 413,810, dated October 29, 1889.

Application filed February 12, 1889. Serial No. 299,640. (No model.)

*To all whom it may concern:*

Be it known that I, LEONARD PAGET, a citizen of the United States, residing at New York, in the county of New York and State of New York, have made a new and useful invention in Systems of Electrical Transformers or Converters, such as are used in the electrical art in the transformation or conversion of currents of an alternating nature from a primary to a secondary circuit, of which the following is a specification.

My invention relates particularly to an improvement in apparatus for the regulation of such systems and in such manner that the amount of energy required at the primary or generating source shall be governed or regulated in accordance with the amount of energy which is to be utilized in the secondary circuit or circuits.

To this end it consists in the novel apparatus hereinafter described, and particularly pointed out in the claims which follow this specification.

Prior to my invention it was customary to construct or arrange transformers or converters of alternating currents of electrical energy of fixed proportions or dimensions—that is to say, it was customary to arrange the primary and secondary circuits of such systems upon a core of given magnetic capacity and having generally a closed magnetic circuit which is constant and fixed in dimensions and capacity, at least so far as regards the primary circuit. In other words, it was customary to so construct them that the primary current was always required to exercise its effect upon the same magnetic mass, and to therefore magnetize and demagnetize said mass, irrespective of the work required in the secondary or working circuit, also influenced by said magnetic mass. This fixed condition of the primary circuit necessarily makes such a transformer or converter an instrument which is more or less inefficient, dependent upon the amount of work required in the secondary circuit, it being at once obvious, as is understood by electricians, that if a given amount of electrical energy is required to magnetize and demagnetize the primary core on account of its magnetic capacity under all conditions, whether with or without a load in the secondary, then when there is a minimum number of translating devices in use in the secondary circuit there will necessarily be much useless expenditure of energy in the primary circuit for the reason indicated.

It is the especial object of my present invention to overcome this difficulty and to devise a transformer which adapts itself to the conditions of the translating devices in the secondary circuit—that is to say, to devise such an apparatus as will cause the amount of energy utilized in the primary circuit to bear a fixed proportion to the amount of energy required in the secondary circuit where the translating devices are in use. I accomplish this object by the apparatus hereinafter described, and particularly pointed out in the claims which follow this specification.

The invention will be better understood by referring to the accompanying drawings, which illustrate the apparatus designed to carry it into effect.

Figure 1 of the drawings is a side elevation of the simplest form of apparatus coming within the terms of my invention. Fig. 2 is a plan view of the same as seen looking down on Fig. 1. Fig. 3 is a plan view of my preferred form of apparatus, showing the circuit-connections of both the primary and secondary circuits. Fig. 4 is a side elevational sectional view taken on line Y Y, Fig. 5, showing part of the apparatus broken away in order to disclose the interior arrangement. Fig. 5 is a vertical longitudinal sectional view of Fig. 4, taken on line 5 5. Fig. 6 is a detail perspective view of a portion of one of the magnetic cores used either in the primary or the secondary apparatus.

Referring now to the drawings in detail, E', Fig. 1, represents the core of the secondary of a transformer or converter, A' representing the coils thereof, and connected by wires $w'\ w'$ to translating devices, as electric lights or analogous apparatus. (Not shown.)

N N represent the free poles of a swinging armature, which is surrounded by a coil A, the free ends of which are connected by wires $w\ w$ to a generator of electricity of the alternating type, or to such generators as are ordinarily used for generating alternating or rapidly-recurring impulses of electricity.

This armature and its coil are fixed to a nonmagnetic axis $d$, pivoted at one end to the yoke of the secondary core and at the other to a support M, the arrangement being such that as the armature or core N N is attracted by the poles N' N' the magnetic circuit through said core and armature is made more or less complete, as shown by the arrows in Fig. 1.

$s^3$ is a spiral spring attached to the armature or core N at one end and at its other to an adjustable screw $s^4$, for regulating the pull upon said core N. The adjustment is such that when a minimum number of translating devices are in operation in the secondary circuit $w'$ $w'$ the armature or core N N is drawn into the position shown in dotted lines in Fig. 2, stops being provided, but not shown, for preventing the armature or core from passing absolutely out of the magnetic field of the core N' N'. With this form of apparatus, and with a proper adjustment of the spring $s^3$ and the screw $s^4$, the position of the core or armature N N will be regulated in accordance with the number of translating devices, so that as translating devices are cut in in said secondary circuit the magnetic effect on the secondary core E' through the poles N' is increased and the core or armature is drawn in the direction of the arrow, Fig. 2, thereby increasing the magnetic capacity of the primary core and necessitating an additional outlay of energy at the generator in the primary circuit, so that when all of the translating devices are cut in to the circuit the armature or core N N will lie in the position indicated by the white space in Fig. 2, and the primary core will then embrace a complete magnetic circuit through N N' and E', which is the circuit of greatest magnetic capacity for the apparatus disclosed. On cutting out any of the translating devices, of course a reverse operation will take place, and the armature or core N N will recede under the influence of $s^3$ until all are cut out, when a minimum amount of energy will be therefore required at the generator, as will be fully understood by electricians.

While this form of apparatus is capable of operation in a beneficial sense, it is not as efficient a device as the apparatus disclosed in Figs. 3, 4, and 5, and this for the reason that, owing to the magnetic lag between the cores of the primary and secondary circuits, the apparatus is somewhat sluggish in responding to changes in the secondary circuit. To overcome this objection, therefore, I have devised the apparatus disclosed in Figs. 3, 4, and 5, as indicated, which I will now proceed to describe.

D is the base of the apparatus, having two upright standards S S', at the upper end of which is secured by two screws $s$ $s'$ a magnetic shaft $a$, carrying by magnetic spiders E E' a pair of converter-coils A A', the former A constituting a set of primary coils wound in series about the laminated cores G, and made of magnetic material in the nature of long thin strips of iron having projecting teeth N N', which constitute the poles of the respective coils, and between which teeth are wound in series on each core the coils A A'. I have shown in this instance six such coils on each core, the arrangements being such that when the coils are wound in position the projecting teeth N N fill the space between said coils on one side and N' N' between those on the other side. The secondary coils A' A' are rigidly fixed upon the axis $a$ by a set-screw $s^2$, which passes through the hub H, while the primary coils A A are adapted to rotate upon the axis $a$, and have a lever L, connected to the hub H, for producing such rotation. This lever L has connected to its free end a solenoid C, located directly in the primary circuit and in series circuit with the coils A, as clearly shown in Figs. 3 and 4. An additional solenoid C' is located in the secondary circuit with translating devices, and surrounds the first-named solenoid. The spiral spring $s^3$, attached by the lever $L^2$ to the rotary primary coils, and by an adjusting-screw $s^4$ to a fixed standard, is designed to regulate the relative location of the cores N N' of the movable and fixed coils under varying conditions.

The operation of this apparatus is as follows: Suppose the adjusting-screw $s^4$ to be so adjusted that the spring $s^3$ will hold the coils A in the least effective position when a minimum number of translating devices are located in the secondary circuit $w'$ $w'$, then, as the translating devices are connected in circuit in the usual manner, the influence of the cores N N' upon each other, as already described in connection with Figs. 1 and 2, together with the additional influence of the solenoids C and C' upon each other in their respective circuits, will cause the coils A to be rotated in the direction of the arrow shown in Fig. 3. This rotation will continue in succession as translating devices are cut in to the circuit until a maximum number is reached for the adjustment between the spring $s^3$ and the adjustment-screw $s^4$, at which time the poles N N' will lie directly opposite to each other, as clearly shown in Fig. 3, and the multiple magnetic circuits through the twelve adjacent poles of the primary and secondary coils will assume a position of maximum efficiency, the regulation for intermediate positions, as required by varying numbers of translating devices in the secondary circuit, being at once obvious, the magnetic circuits varying in accordance with the regulation indicated. I prefer to make the cores G G' of the two sets of coils of thin magnetic strips G G', having magnetic pole-pieces N N', located at definite intervals in each set, such cores being in the nature of laminated structures and obviously free from the annoying influence due to Foucault currents and other well-known disturbances. When these cores are made up by winding them spirally, as shown in Figs. 4 and 5, they are secured to the spiders E and E' by bolts or other equivalent means in such manner as to insure strength of the parts and close proximity of the pole-pieces under all conditions of load. It will be understood, of course, that the secondary coil might be stationary and the fixed coil movable upon axis $a$, such feature constituting a mere reversal of parts; or one or both coils might be movable, either laterally or longitudinally, upon said axis, the principle being that no matter how the relative magnetic conductivity of the cores be varied the apparatus should still come within the scope of my invention.

I do not limit myself to the specific mechanism hereinbefore described as I desire it to be understood that my claims shall be broad enough to include any apparatus in a system of transformers which includes means located in the secondary circuit for automatically varying the power required to generate the current in the primary circuit in accordance with the demands made by the translating devices in the secondary circuit; nor do I claim in this application the method of operation by which said regulation is effected, as I propose to file a divisional application in which such method claims will be made.

Having thus described my invention, what I claim, and desire to secure by Letters Patent of the United States, is—

1. A transformer or converter having a primary coil connected in circuit with a source of electrical energy and a secondary coil connected in circuit with one or more translating devices, with means located directly in one leg or branch of the secondary circuit for regulating the energy required in the primary circuit in accordance with the demands of the translating devices, substantially as described.

2. A transformer or converter having a primary coil and a secondary coil, the latter including in its circuit one or more translating devices, with electro-magnetic means located directly in one leg or branch of the secondary circuit for regulating the energy required in the primary circuit in accordance with the demands of the translating devices in use, substantially as described.

3. A regulator for transformers or converters, consisting of primary and secondary coils, including, respectively, the current-source and translating devices, in combination with means located in one leg or branch of the secondary circuit for automatically varying the magnetic condition of the converter-cores in accordance with the demands of the translating devices, substantially as described.

4. A regulator for transformers or converters, consisting of primary and secondary coils, including, respectively, the current-source and translating devices, in combination with an adjustable armature for changing the magnetic condition of the converter-core, and means under the control of the translating devices, located in one leg or branch of the secondary circuit, for effecting this change in accordance with the current demands of the translating devices, substantially as described.

5. A regulator for transformers or converters wherein current-impulses are transformed from a primary to a secondary system, consisting of one or more fixed coils located in the secondary circuit and having fixed cores, with one or more movable primary coils having a movable core, the poles of which are located in close proximity to the poles of the secondary core, substantially as described.

6. A regulator for use in a system of converters or transformers wherein primary currents in one circuit of electricity are converted into secondary currents in a second circuit, consisting of one or more fixed coils located in the secondary circuit, with translating devices, said coils being wound about a fixed core or cores, in combination with one or more movable coils wound about a movable core or cores, and included in the primary circuit, in combination with two solenoids, one located in the primary and the other in the secondary circuit, the one surrounding the other, with mechanical connections between one of said solenoids and the rotary coils, whereby the relative location of the poles of said coils is varied in accordance with the current demands in the secondary circuit, substantially as described.

7. A transformer or converter having core-pieces made of two parts, one of said parts constituting the core for the primary and the other the core for the secondary of said transformer, the poles of said primary and secondary being adjustable with relation to each other, whereby the magnetic circuit of said transformer or converter may be adjusted for maximum or minimum effect, substantially as described.

8. A core for a transformer, consisting of a thin sheet of magnetic material having projecting pole-pieces located at stated intervals, the whole being wound, as described, in spiral form, so that the pole-pieces constitute shoulders against which the coils rest when wound in place, substantially as described.

9. A converter consisting of a fixed secondary magnet, in combination with a movable primary magnet, said magnets having cores or pole-pieces adapted to slide past each other, substantially as described.

10. A converter consisting of a fixed secondary magnet and a movable primary magnet, said magnets having cores lying in close proximity to each other, in combination with means for causing said poles to vary their magnetic relations, substantially as described.

11. A converter consisting of a series of secondary coils wound upon a fixed circular core having internally-projecting pole-pieces, in combination with a series of primary coils wound upon a similar movable core having internally-projecting pole-pieces, which are adapted to slide past the first-named pole-pieces, and a magnetic axle joining said core-pieces, with mechanical connections, as described, and a pair of solenoids located, respectively, in the primary and secondary circuits, one of said solenoids being attached to the mechanical connections which move the movable coils, substantially as described.

12. A transformer or converter having a primary coil connected in circuit with a source of electrical energy, and a secondary coil connected in circuit with one or more translating devices, with means, also located in the secondary circuit, but in one leg or branch only thereof, for regulating the energy required in the primary circuit in accordance with the demands of the translating devices in the secondary circuit, substantially as described.

13. A transformer or converter having its primary coil connected in circuit with a source of electrical energy and its secondary coil connected in multiple-arc circuit with two or more translating devices, in combination with an electro-magnet or solenoid, also located in the secondary circuit, but in series with the multiple-arc translating devices and connections, as described, the whole being arranged for regulating the energy required in the primary circuit in accordance with the demands of the translating devices in the secondary circuit.

LEONARD PAGET.

Witnesses:
H. H. ELDRED,
L. V. HARWOOD.